United States Patent [19]

Payen

[11] 4,126,499

[45] Nov. 21, 1978

[54] METHOD OF MANUFACTURE OF A RIGID, PERFORATED CLOTH

[75] Inventor: Pierre Payen, Lyons, France

[73] Assignee: L. Payen & Cie, Lyons, France

[21] Appl. No.: 829,054

[22] Filed: Aug. 30, 1977

[30] Foreign Application Priority Data

Sep. 10, 1976 [FR] France .................................. 76 27527

[51] Int. Cl.² ........................ B32B 1/08; B32B 31/26; D03D 15/00
[52] U.S. Cl. .................................... 156/148; 156/296; 210/506; 210/507; 210/510
[58] Field of Search ............... 156/148, 149, 180, 296, 156/306; 428/222, 223, 224, 225, 226, 227, 228, 229; 57/140 BY, 144; 210/499, 500 R, 506, 507, 510

[56] References Cited

U.S. PATENT DOCUMENTS

| | | | |
|---|---|---|---|
| 2,417,453 | 3/1947 | Wade | 156/296 |
| 2,769,222 | 11/1956 | Southwell | 156/148 |
| 3,558,412 | 1/1971 | Kurz | 156/148 |
| 3,572,397 | 3/1971 | Austin | 57/140 BY |
| 3,623,937 | 11/1971 | Gasaway | 156/148 |
| 3,937,860 | 2/1976 | Gusman et al. | 156/148 |

*Primary Examiner*—Caleb Weston
*Attorney, Agent, or Firm*—Arnold, White & Durkee

[57] ABSTRACT

A method for manufacturing a rigid, perforated cloth wherein the cloth is woven, in both the warp and weft directions of core yarns wrapped with a thermoplastic covering yarn. After weaving, the cloth is subjected to heating at a temperature greater than the melting point of the thermoplastic covering yarn. The cloth is thereafter cooled, thereby imparting rigidity to the perforated cloth.

The product of the present invention is a rigid, perforated cloth in which the individual yarns of the cloth comprise a core yarn that is covered with a thermoplastic cover. The rigid, perforated cloth displays reinforced structural networks due to the plasticity of the thermoplastic material and enhanced resistance to physical and chemical degradation.

9 Claims, No Drawings

METHOD OF MANUFACTURE OF A RIGID, PERFORATED CLOTH

BACKGROUND OF THE INVENTION

The present invention relates to a method for manufacturing a rigid, perforated cloth or fabric.

It is well known in the art to adapt woven fabrics as filter elements for filtering particulate matter from a liquid or gaseous fluid as that fluid passes across the woven fabric filter element. Such filter elements have been produced from woven metallic wire; however, filters so produced suffer the disadvantage that they cannot be used for the filtration of chemical compounds with which the metal of the wires is prone to react.

Woven fabric filter elements have also been made from monofilament of synthetic materials such as, for example, polyester. However, these filter elements suffer from shortcomings essentially inherent to the ability of the synthetic monofilaments to stretch, thus limiting their use to working pressures below the irreversible elastic deformation limit of the synthetic materials.

It has been proposed to manufacture filter fabrics from glass yarns, but such filters, because of the transverse fragility of the elementary glass filaments, show poor resistence to abrasion by the materials to be filtered and accordingly deteriorate rapidly.

In order to overcome these and other shortcomings, it has been proposed to coat the filter fabric material with a suitable thermoplastic polymer. However, this technique has not been entirely satisfactory because such technique is delicate to carry out, requires specific apparatus to coat the fabrics with an appropriate polymer and, finally, does not provide for satisfactory control in the way the individual yarns comprising the fabric network are bonded together, thereby producing deformation of the fabric network which adversely affects the filtering capacity of the woven fabric filter.

It has also been proposed to produce woven fabrics from yarns previously coated with a sleeve of plastic by weaving the coated yarns into a fabric network and thereafter heating the fabric by, for example, hot calendering, in order to bond the yarns to each other at their points of intersection. Such procedures are more specifically described in French Pat. Nos. 1,041,697 and 1,502,610. Unfortunately, this technique, which is satisfactory for the manufacture of fabrics for window blinds and curtains, requires special equipment, precise operation and considerable time in which to make the woven fabric.

SUMMARY OF THE INVENTION

The method of the present invention permits the manufacture of a rigid, perforated cloth comprising, in both the warp and weft directions, yarns coated with a thermoplastic material. According to the method of the present invention, a core yarn is wrapped with a covering yarn made from a thermoplastic polymer to produce a wrapped yarn. The wrapped yarn is thereafter woven into a perforated cloth. Heating the perforated cloth to a temperature in excess of the melting temperature of the thermoplastic polymer but below the melting and deformation temperatures of the core yarn causes the thermoplastic polymer to melt. Upon cooling the heated cloth, a rigid, perforated cloth is produced in which the points of intersection of the yarns adhere to each other due to the prior melting of the thermoplastic polymer of the cover.

According to one aspect of the method of the present invention, the heating step proceeds in a discontinuous manner and in another aspect of the present invention, the heating step proceeds in a continuous manner.

The rigid, perforated cloth of the present invention comprises a cloth woven from a core yarn with a covering yarn would uniformly and contiguously around the core yarn.

In one aspect of the present invention, the core yarn comprises a synthetic yarn made from heat stable aromatic polyamides, polyamideimides or polyimides. In another aspect of the invention, the core yarn is made from refractory materials such as carbon, silicon or boron or continous glass fiber filaments or roving.

The covering yarn of the present invention is preferably a synthetic yarn of continuous filaments which is chemically compatable with materials that come into contact with the perforated cloth. The covering yarn may comprise thermoplastic polymers such as Nylon-6, Nylon-11, Nylon-66, polyesters and polyolefins such as polyethylene or polypropylene.

DESCRIPTION OF THE PREFERRED EMBODIMENT

The present invention relates to a rigid, perforated cloth and the process for manufacturing the same. The rigid, perforated cloth comprises a cloth woven from a core yarn having a thermoplastic covering yarn wound uniformly and contiguously around the core yarn. The cloth is subjected to heat treatment to cause the covering yarn to melt, thereby imparting rigidity to the perforated cloth through subsequent cooling.

The core yarn used in the practice of the present invention may be any man made textile yarn displaying good breaking strength and high heat resistance. For example, the core yarn preferred should have the strength and performance characteristics envisioned for the woven rigid cloth. Additionally, the core yarn should display heat resistance sufficient such that no significant deterioration in the mechanical properties of the yarn occurs at temperatures in excess of 300° C. For example, the core yarn may be of continuous glass fiber filaments or roving or may comprise heat stable yarns such as those produced from aromatic polyamides, polyamide-imides, polyimides or refractory materials such as carbon, silicon or boron. A particularly effective core yarn is, for example, made of continuous filaments of aromatic polyamides displaying a high base modulus such as, for example, poly-(p-phenyleneterephthalamide) marketed by E. I. Dupont de Nemours under the trademark "KEVLAR".

The covering yarn used in the present invention is preferably a synthetic thermoplastic yarn of continuous filaments which is chemically compatible with the materials to be filtered. By way of examples, the covering yarn may comprise thermoplastic polymers such as nylon 6, nylon 11, nylon 66, polyesters, and polyolefins such as polyethylene and polypropylene.

As used herein the term "polyester" describes a yarn material made from a linear polyester comprising at least 85% (by weight) in the chain of an ester of a dihydric alcohol and terephthalic acid.

Wrapping of the core yarn with the covering yarn is effected by conventional techniques well know in the art, such as single or crossed double wrapping, However, it is important that the covering yarn be wound uniformly and contiguously about the core yarn in order to assure that the surface of the core yarn is completely covered with the covering yarn. Accordingly, it is preferred that during the wrapping procedure the core yarn be stretched and the cover is single.

With the core yarn having been wrapped with the covering yarn, weaving of the wrapped yarn in warp and weft directions proceeds according to conventional weaving techniques until a woven fabric has been produced.

Once the woven fabric has been produced, it is heated to a temperature slightly above the melting point of the thermoplastic polymer comprising the covering yarn. It is essential that the polymer comprising the covering yarn melts without decomposition or degradation. Use of acrylic or vinylic fibers is prohibited. Moreover, it is important to assure that the heating temperature remains below both the melting point and the deformation temperature of the core yarn so as not to adversely affect the integrity of the core yarn. Heating continues until the thermoplastic material surrounding the core yarn uniformaly melted along the surface of each strand of the core yarn. One skilled in the art will easily determine, without undue experimentation, the operating conditions necessary for such heating treatment in accordance with the thermoplastic material comprising the covering yarn. Table I presents the melting points of representative examples of thermoplastic polymers which may be used as the covering yarn.

Table 1

| Representative Covering Yarn | Melting Point, ° C |
| --- | --- |
| Nylon 6 | 230 |
| Nylon 66 | 260 |
| Polyester 4GT | 260 |
| Polypropylene | 175 |
| Polyethylene | 130 |

Furthermore, during the heating operation, the woven fabric may or may not be stretched. Additionally, the heat treatment may be carried out continuously such as, for example, on a stenter, or discontinuously, as in the use of an oven.

After heating, the woven fabric is allowed to cool. Cooling may occur by simply allowing the woven fabric to reach atmospheric equilibrium, or may be effected by passing cool air or any other type of gas over the woven fabric.

The fabric produced by the practice of the method of the present invention generally comprises an assembly of crossed yarns coated with a contiguous covering of a thermoplastic linear polymer which forms a protective sleeve around the core yarn. Furthermore, at the points of intersection of the yarns, the covering, due to the plasticity of the thermoplastic polymer, adhers to itself thus affording an improved mechanical hold of the network so formed. Additionally, the fabric so produced resists abrasion and fraying. Accordingly, a filter element produced from the woven fabric of the present invention displays the characteristic of decreased deformation on repeated stressing.

By practicing the method of the present invention, the following examples of rigid, perforated cloth are produced.

EXAMPLE 1

Utilizing a core yarn of a glass roving yarn of 320 Tex with 7 micron gauge (count) per unit filament and a single covering yarn comprising a continuous multifilaments polyester yarn with 280 dtex/50 filaments, a thermoplastic polymeric wrapped yarn is produced on a wrapping frame. The wrapping twist of 1500 turns per meter in the S direction gives a uniform join and contiguous cover of the core yarn by the covering yarn. The yarn so produced has a gauge of 390 Tex.

Utilizing this yarn, a perforated plain weave fabric with warp and weft of the same construction, i.e., 4 ends per centimeter in the warp and 4 picks per centimeter in the weft is produced on a loom. Such construction is similar to that conventionally used for application in filter fabrics.

Coming off the loom, this fabric is placed, for two minutes, in an oven heated to 265° C. This discontinuous heating process occurs without applying tension on the fabric.

The practice of the method of the present invention according to this example produces a rigid, perforated warp and weft fabric in which the yarns adhere to one another at their points of intersection due to the thermoplastic properties of the covering. Furthermore, the core yarn is covered with a substantially uniform, contiguous and join protective sleeve of linear thermoplastic polymer. The fabric so produced exhibits a balanced and controlled, substantially square network and displays heat and chemical resistance as well as resistance to fraying, rubbing and repeated stresses. Additionally, the fabric shows little pressure drop across the fabric and displays an excellent capacity for filtering dusts.

EXAMPLE 2

Example 1 is repeated except that the heat treatment is carried out continously by passing the fabric which has come off the loom through a stenter heated to 290° C. During the heating process the fabric is held under tension for 90 seconds.

A rigid fabric similar to that described in Example 1 is obtained.

EXAMPLE 3

A yarn comprising the following is produced on a wrapping frame:

Core yarn — a yarn of a heat-stable aromatic polyamide, based on poly-(p-phenylene-terephthalamide), such as sold by E. I. Dupont de Nemours under the trademark "KEVLAR", Type 29. The gauge of the core yarn is 220 dtex;

Single Covering yarn — a polyester yarn comprising 23 continuous filaments with a gauge of 78 dtex;

Wrapping twist — 1900 turns per meter in the S-direction, thereby providing a uniform and contiguous covering of the core yarn and a final gauge of 350 dtex.

Using this yarn, a warp and weft perforated fabric is produced in a 2/1 serge weave. The warp construction is 22 ends per centimeter and the weft construction is 23 picks per centimeter. The weight per square meter of the resulting fabric is approximately 160 grams.

Coming off the loom, the fabric is placed, without tension, for 4 minutes in an oven heated to 290° C.

A rigid, perforated warp and weft fabric is obtained in which the yarns adhere to one another at the points of intersection due to the thermoplastic properties of the covering. The core yarn is covered with a substantially uniform and contiguous protective sleeve of the thermoplastic polymer. The fabric so produced exhibits a balanced and controlled network and displays good heat and chemical resistance as well as resistance to fraying, rubbing and repeated stresses. The construction of the fabric of the present example is similar to that used as a filter fabric in paper making, e.g., Foudrinier wire, and exhibits little pressure loss across its surface when used as such a filter.

EXAMPLE 4

A warp and weft woven fabric is produced having properties useful for the manufacture of boat sails.

The yarn used in the warp direction comprises, alternatively, one end made from an aromatic polyamide yarn with a gauge of 220 dtex such as manufactured by E. I. Dupont de Nemours and sold under the trademark "KEVLAR", Type 29 and one end of a wrapped yarn prepared as in Example 3. The yarn used in the weft direction comprises one pick of an aromatic polyamide yarn of gauge 220 dtex and 1 pick of a wrapped yarn prepared as in Example 3.

The heating procedure used in this example is the same as that in Example 3.

The rigid fabric prepared according to this example displays good dimensional stability and has applications such as, for example, filter fabrics, paper making wires, boat sails and reinforcing nets.

EXAMPLE 5

Example 3 is repeated except that the wrapping twist is 1950 turns per meter in the S-direction producing a wrapped yarn with a gauge of 350 dtex. This yarn is woven in a serge 6 × 6 double face warp with 46 ends per centimeter in the warp direction and 24 to 25 picks per centimeter in the weft direction. The weight of the finished fabric is approximately 250 grams per meter.

After continuous heat treatment, the rigid, perforated fabric exhibits the physical characteristics found in Table Table 2

| Tensile strength* | $LD^1$ = 7540 nt |
| --- | --- |
| | $TD^2$ = 4410 nt |
| Elongation at break* | $LD^1$ = 16.7% |
| | $TD^2$ = 8.1% |
| Abrasion resistance** | 9100 cycles |

By way of comparison, a conventional paper making wire produced with the same weave and having the same construction as the fabric produced in this example and produced from polyester monofilaments of 450 dtex and weighing about 400 grams per square meter exhibits the physical characteristics found in Table 3.

Table 3

| Tensile strength* | $LD^1$ = 3850 nt |
| --- | --- |
| | $TD^2$ = 1820 nt |
| Elongation at break* | $LD^1$ = 54% |
| | $TD^2$ = 48% |
| Abrasion resistance** | 220 cycles |

*measured on an Instron tensometer
**measured on an abrasimeter up to complete wear
[1]warp direction
[2]weft direction By comparing Table 2 and Table 3, it is thus seen that the fabrics produced according to the practice of the present invention exhibit increased resistance to both breaking and abrasion while exhibiting less elongation. Accordingly, such fabrics may be used successfully as paper making wire.

EXAMPLE 6

Example 5 is repeated with a 4 satin weave and a conventional construction for a paper making wire. The results obtained in this example are similar to those reported in Example 5, immediately above.

EXAMPLE 7

Example 1 is repeated except that the covering yarn is nylon 66 of 300 deniers. The rigid, perforated cloth produced displays properties as described in Example 1.

The present invention has been described with respect to certain embodiments and examples thereof. One will readily appreciate that modifications and changes can be made to the present invention while still falling within its spirit and intent.

Accordingly, all examples given herein should be construed as non-limiting in nature.

What is claimed is:

1. A method for producing a rigid, perforated cloth comprising:
   a. wrapping a core yarn with a covering yarn made from a thermoplastic polymer to produce a completely wrapped yarn,
   b. weaving said wrapped yarn into a perforated cloth in both warp and weft directions,
   c. heating said cloth to a temperature in excess of the melting temperature of said thermoplastic covering polymer but below the deformation and melting temperatures of said core yarn in order to melt said covering thermoplastic polymer,
   d. cooling said heated cloth to provide a rigid, perforated cloth in which the points of intersection of the wrapped yarn adhere to each other due to the prior melting of said thermoplastic polymer.

2. The method according to claim 1 wherein said heating step comprises discontinuous heating.

3. The method according to claim 1 wherein said heating step comprises continuous heating.

4. The method according to claim 1 wherein said covering yarn is choosen from the group consisting of polyolefine, polyamide and polyester.

5. The method according to claim 1 wherein said covering yarn comprises a multifilaments synthetic yarn.

6. The method according to claim 1 said wrapped yarn is a single cover.

7. The method of claim 1 wherein said core yarn is chosen from the group consisting of a heat-stable aromatic polyamide, a polyamide-imide, a polyimide, carbon boron, silicon and glass-fiber.

8. The method according to claim 7 wherein said core yarn comprises poly-(p-phenylene terephtalemide).

9. A method for producing a rigid, perforated cloth comprising:
   a. Wrapping a core yarn with a covering yarn made from a first thermoplastic polymer to produce a completely wrapped yarn,
   b. weaving said wrapped yarn alternatively with a second yarn made from a second thermoplastic polymer into a fabric in both weft and warp directions,
   c. heating said fabric to a temperature in excess of the melting temperature of said first and second thermoplastic polymers but below the deformation and melting temperatures of said core yarn in order to melt said thermoplastic polymers; and
   d. cooling said heated fabric to provide a rigid fabric in which the points of intersection of the wrapped yarn adhere to each other due to the prior melting of said thermoplastic polymers.

* * * * *

UNITED STATES PATENT AND TRADEMARK OFFICE
CERTIFICATE OF CORRECTION

PATENT NO. : 4,126,499
DATED : November 21, 1978
INVENTOR(S) : Pierre Payen

It is certified that error appears in the above-identified patent and that said Letters Patent are hereby corrected as shown below:

Column 2, line 9, "would" should be -- wound --.

Column 3, line 22, "uniformaly" should be -- uniformly --.

Column 5, line 39, insert -- 2 -- after the word "Table".

Signed and Sealed this

Twenty-seventh Day of March 1979

[SEAL]

Attest:

RUTH C. MASON
Attesting Officer

DONALD W. BANNER
Commissioner of Patents and Trademarks